US012601154B2

(12) United States Patent
Beschorner et al.

(10) Patent No.: US 12,601,154 B2
(45) Date of Patent: Apr. 14, 2026

(54) TRENCH MEASUREMENT SYSTEM

(71) Applicant: Caterpillar SARL, Geneva (CH)

(72) Inventors: Matthew Beschorner, Plainfield, IL (US); Nathan Bjerke, Peoria, IL (US); Corey Lee Gorman, Peoria, IL (US)

(73) Assignee: Caterpillar SARL, Geneva (CH)

( * ) Notice: Subject to any disclaimer, the term of this patent is extended or adjusted under 35 U.S.C. 154(b) by 1000 days.

(21) Appl. No.: 17/713,395

(22) Filed: Apr. 5, 2022

(65) Prior Publication Data

US 2023/0313502 A1 Oct. 5, 2023

(51) Int. Cl.
| *E02F 9/26* | (2006.01) |
| *E02F 3/32* | (2006.01) |
| *G01B 11/22* | (2006.01) |

(52) U.S. Cl.
CPC ................ *E02F 9/261* (2013.01); *E02F 3/32* (2013.01); *G01B 11/22* (2013.01)

(58) Field of Classification Search
CPC ... E02F 9/261; E02F 3/32; E02F 3/435; E02F 5/145; G01B 11/22
See application file for complete search history.

(56) References Cited

U.S. PATENT DOCUMENTS

| 4,884,939 A | 12/1989 | Nielsen |
| 4,888,890 A | 12/1989 | Studebaker et al. |
| 5,682,311 A * | 10/1997 | Clark ...................... E02F 3/435 |
| | | 701/50 |

| 8,164,338 B2 | 4/2012 | Fling et al. |
| 8,817,238 B2 | 8/2014 | Montgomery |
| 11,149,411 B2 | 10/2021 | Edamura et al. |
| 11,508,091 B2 * | 11/2022 | Atsumi ................ H04N 13/246 |
| 2017/0175364 A1 * | 6/2017 | Hasegawa ............... G06T 11/40 |
| 2017/0292248 A1 * | 10/2017 | Matson ................... E02F 9/264 |
| 2018/0182120 A1 * | 6/2018 | Izumikawa ............. G06T 7/593 |
| 2019/0330825 A1 * | 10/2019 | Tanimoto ............... B60K 35/23 |
| 2019/0360179 A1 * | 11/2019 | Moriki ..................... E02F 3/43 |

(Continued)

FOREIGN PATENT DOCUMENTS

| CN | 207032350 U | 2/2018 | |
| JP | 2016008484 A | * 1/2016 | ............ E02F 9/0858 |

OTHER PUBLICATIONS

JP2016008484A_Description_English Translation.*

(Continued)

*Primary Examiner* — Assres H Woldemaryam

(57) ABSTRACT

A work machine comprising a trench measurement system for measuring a trench depth and trench angle during a trench digging operation is disclosed. The work machine comprises a range finder system mounted on the boom and includes a plurality of rangefinders, each rangefinder includes a beam device configured to determine a distance of a plurality of rays irradiated from the beam device to a trench floor. An on-board controller is configured to calculate the trench depth from data received by the range finder system on the boom, the sensor assembly, the boom position on the working mechanism, and attributes of the work machine. A method for measuring a trench depth and trench angle associated with a trench digging operation with range finders mounted on the boom of a work machine is also disclosed.

20 Claims, 7 Drawing Sheets

(56) References Cited

U.S. PATENT DOCUMENTS

2022/0074171 A1 * 3/2022 Izumikawa ............ E02F 3/435

OTHER PUBLICATIONS

Sandy et al. "Autonomous Repositioning and Localization of an In situ Fabricator", 2016.*

Howard N. Cannon, "Extended Earthmoving with an Autonomous Excavator", 1999.*

Written Opinion and International Search Report for Int'l. Patent Appln. No. PCT/EP2023/025141, mailed Jul. 11, 2023 (14 pgs).

* cited by examiner

700

Providing a plurality of range finders on a boom of a work machine —702

Directing the rays of the range finders towards a trench floor —704

Calculate the boom displacement and boom altitude —706

Calculate the trench depth —708

Calculate the trench floor angle —710

Display trench depth and trench floor angle on a display panel —712

TRENCH MEASUREMENT SYSTEM

TECHNICAL FIELD

The present disclosure generally relates to work machines, and more specifically relates to work machines for digging trenches.

BACKGROUND

Work machines such as backhoes, front-end loaders, and excavators are used to move earth, soil, and other material to create trenches at a dig site or landscape. When operating a work machine, such as an excavator, in a trench digging application, often times a second worker is needed to measure the trench depth. More specifically, a first person in the form of a machine operator will be placed in the machine to dig the trench, and a second person will stand alongside the machine with a trench rod. This second person will periodically check trench depth with the trench rod to confirm design intent of the trench.

Traditional methods of determining the depth of a trench to a trench floor are gathered by the use of trench rods. Other methods have made attempts to measure the depth of a trench while operating a work machine during a trench digging operation. For example, CN Patent No. 207032350U (hereinafter "350 Patent") discloses an excavating equipment for excavating irrigation canals and ditches. The excavating equipment comprise a control device, the control device has a GIS module and a processor that provides geographical location information. The GIS module includes an input for inputting excavation information device, a rangefinder for measuring real-time distance information of trench construction surface and bucket, and a navigation device for providing location information and a display interface. The rangefinder may be a laser rangefinder mounted on the arm of the excavation equipment or a binocular vision imaging unit arranged on the movable body of the excavation equipment. The rangefinder is placed on the arm to avoid vibration and interference when arranged on the bucket as well as to avoid an accuracy drop on the movable body. The excavation equipment includes a coordinate converter that converts position information received from the rangefinder into 3D coordinates with updating a navigation device as the origin.

Based on the foregoing, it can be seen that it is desirable to have a work machine that can measure the trench depth during a trench digging operation without the need for a second person with a trench rod, or the expensive methods of storing landform data, geographical location information, and updating current landform information by calculating and converting three-dimensional position coordinates. A simpler and more cost-effective method is desirable to measure the distance to a trench floor during a trench digging operation.

SUMMARY OF THE DISCLOSURE

In one embodiment, a work machine capable of measuring a trench depth during a trench digging operation is disclosed. The work machine comprising: a frame; a ground engaging element supporting the frame for movement; an engine mounted on the frame; a working mechanism extending from the frame comprising a boom, an arm, and a work implement; a trench measuring system comprising a sensor assembly, a range finder system, and an on-board controller. The sensor assembly comprising a plurality of sensors mounted on the work machine. The range finder system is mounted on the boom at a boom position and includes a plurality of rangefinders, each rangefinder includes a beam device configured to determine a distance of a plurality of rays irradiated from the beam device to a trench floor. The on-board controller configured to calculate the trench depth from data received by the range finder system, the sensor assembly, the boom position on the working mechanism, and attributes of the work machine.

In another embodiment, a trench measuring system for measuring a trench depth associated with a work machine conducting a trench digging operation is disclosed. The trench measuring system comprising: an on-board controller on the work machine; a sensor assembly, the sensor assembly comprising a plurality of sensors mounted on the work machine; a range finder system, the range finder system is mounted on a boom at a boom position. The range finder system further includes a plurality of rangefinders, each rangefinder including a beam device configured to determine the distance a plurality of rays from the beam device to the trench floor. The on-board controller is configured to calculate the trench depth from data received by the plurality of rays, attributes of the work machine, the sensor assembly, and the boom position on the working mechanism.

In another embodiment, a method for measuring a trench depth associated with a trench digging operation using a work machine comprising a frame, a ground engaging element supporting the frame for movement, an engine mounted on the frame; a working mechanism extending from the frame comprising a boom, an arm, and a work implement is disclosed. The method comprises: providing a plurality of range finders mounted on a boom of the work machine; directing one or more rays from the plurality of range finders towards a trench floor; and calculating the trench depth based on the rays and a position of the machine boom.

These and other aspects and features of the present disclosure will be better understood upon reading the following detailed description when read in conjunction with the accompanying drawings.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Figure 1:
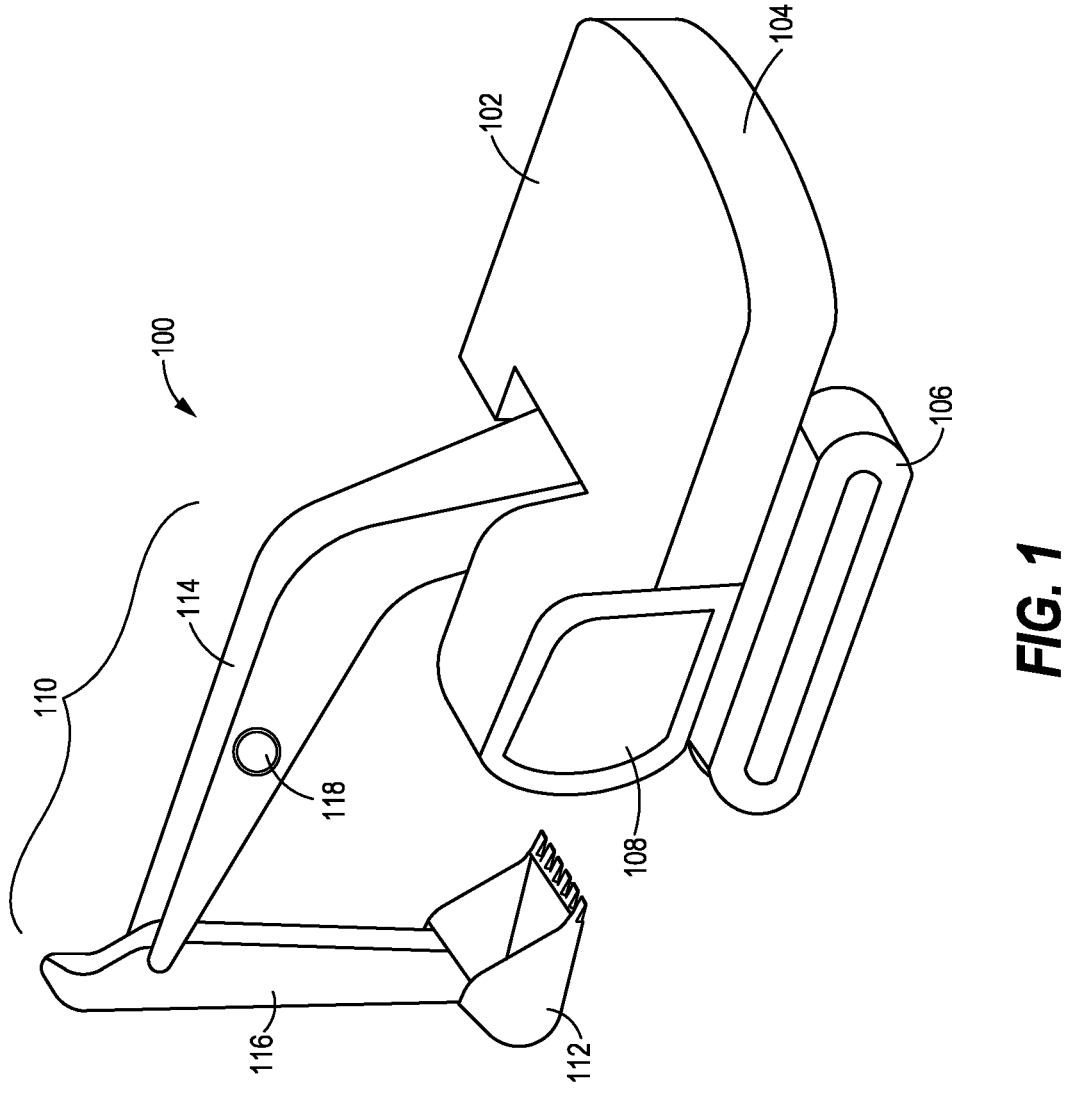
FIG. 1 is a perspective view of a work machine comprising a range finder system on the working mechanism, in accordance with an embodiment of the present disclosure.

Referring now to the drawings, and with specific reference to FIG. 1, an exemplary work machine 100 is shown, illustrated as an excavator, and may be used, for example, for removing earth, soil, and other material from a landscape during a trench digging operation. Excavators are heavy equipment designed to move earth material from the ground or landscape at a dig site. Excavators are typically large and capable of excavating large volumes of earth at a single time by scraping or digging earth from beneath the ground or landscape surface. While the following detailed description describes an exemplary aspect in connection with the excavator, it should be appreciated that the description applies equally to the use of the present disclosure in other machines including but not limited to backhoes, front-end loaders, and draglines, as well.

The work machine 100 comprises a frame 102 supporting an engine 104. The frame 102 is supported on ground engaging elements 106 illustrated as continuous tracks. It should be contemplated that the ground engaging elements 106 may be any other type of ground engaging elements 106 such as, for example, wheels, etc. The work machine 100 further includes a cab 108 supported by the frame 102 and a working mechanism 110 extending from the frame for conducting work, such as, for example, excavating landscapes or otherwise moving earth, soil, or other material at a dig site. The frame 102 may be an upper swiveling body common with excavators.

The working mechanism 110 includes a work implement 112 used to remove earth, soil, and other material from a landscape site. As illustrated in one embodiment, the working mechanism may have a boom 114 and an arm 116 generally found on an excavator, the boom 114 extending from the frame 102.

The working mechanism 110 further comprises a range finder system 118 mounted on the working mechanism 110. As illustrated in one embodiment, the range finder system 118 is mounted on the boom 114 of the working mechanism 110. The range finder system 118 is configured to measure the distance from the position of the range finder system 118 on the boom 114 to the ground. The range finder system 118 is configured to measure a trench depth associated with a trench digging operation by the work machine 100 at a dig site.

Figure 2:
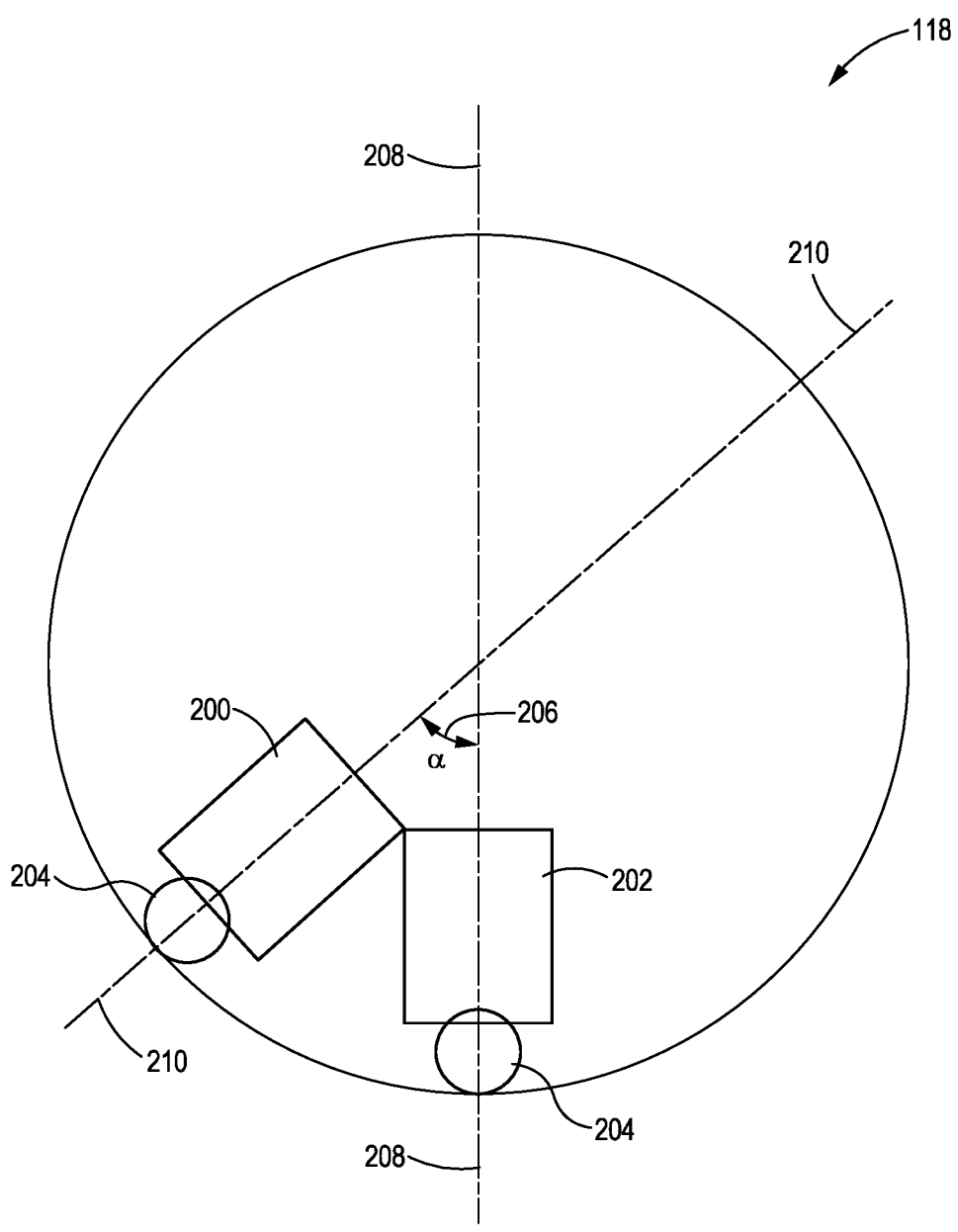
FIG. 2 is a schematic view of the range finder system on the working mechanism, according to an embodiment.

Referring now to FIG. 2, in one embodiment, the range finder system 118 comprises of first rangefinder 200 and a second rangefinder 202. The first rangefinder 200 and the second rangefinder 202 each comprise of a beam device 204 that uses a beam for measuring a distance to an object, as generally known in the arts. The beam device 204 may be a laser device that measures a distance to an object using a laser, or other range finding device that uses a beaming device to measure a distance to an object as generally known in the arts.

The first rangefinder 200 and second rangefinder 202 may be mounted on the boom 114 forming a ray angle 206 by a first ray 208 from the first rangefinder 200 and a second ray 210 from the second rangefinder 202. The ray angle 206 may be a known fixed angle determined when mounting the first rangefinder 200 and the second rangefinder 202. A person having skill in the ordinary arts will recognize that there may be more than two rangefinders comprised in the range finder system 118, which may aid in determining a width of a trench by using similar principles as described herein.

Figure 3:
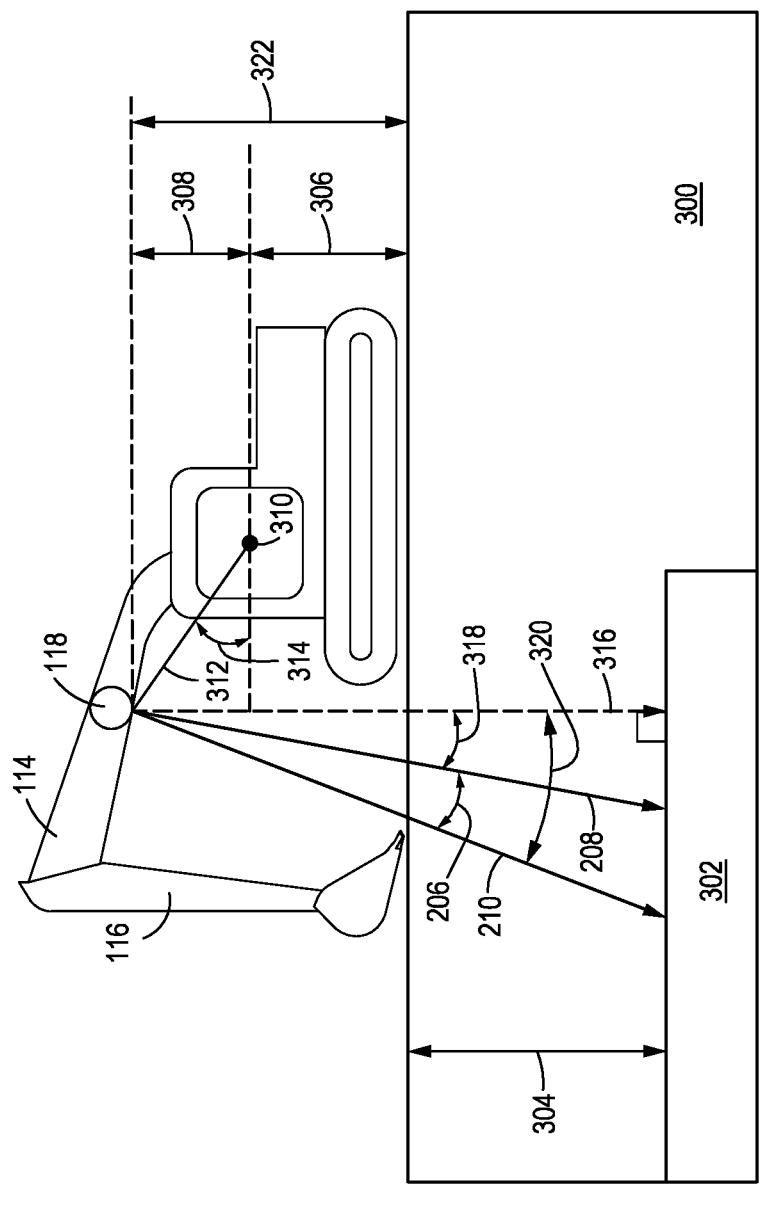
FIG. 3 is a schematic view of the work machine at a dig site measuring the trench depth with the range finder system at ground level, according to an embodiment.

Referring now to FIG. 3, in one illustrated embodiment, the work machine 100 is at a ground level site 300 excavating earth material to dig a trench to a certain depth. As the work machine 100 excavates earth material from the ground level site 300, the range finder system 118 can measure the distance to a trench floor 302 and determine a trench depth 304.

The trench depth 304 is determined by the distance of the first ray 208 to the trench floor 302, the distance of the second ray 210 to the trench floor 302, a track height 306, and a boom altitude 308. The track height 306 is a known value from the work machine 100 determined by the distance from the bottom of the ground engaging elements 106 (from the ground) to a focal point 310. The focal point 310 may be positioned on a location on the cab 108 or on another portion of the work machine 100 such as the frame 102. The boom altitude 308 is determined by first calculating a boom displacement 312 distance from the focal point 310 to the range finder system 118 and then use the boom displacement 312 and a boom angle 314 to calculate the boom altitude 308. It should be recognized that the boom displacement 312 is a hypotenuse of a right triangle. The boom displacement 312 and the boom angle 314 is used to calculate the boom altitude 308 which is a leg of the right triangle representing the vertical altitude from the focal point 310 to the altitude of the range finder system 118. The track height 306 plus the boom altitude 308 equals the vertical altitude from the range finder system 118 to the ground on which the ground engaging elements 106 sit. A perpendicular altitude 316 from the range finder system 118 to the trench floor 302 aids in determining the trench depth 304 by subtracting the track height 306 and the boom altitude 308 from the perpendicular altitude 316. The first ray 208 or the second ray 210 may be set perpendicular to the trench floor 302 to obtain the perpendicular altitude 316 distance to the trench floor 302. A first altitude angle 318 and a second altitude angle 320 may also be known when mounting the range finder system 118 to the boom 114 and setting the ray angle 206. The first altitude angle 318 is the angle between the first ray 208 and the perpendicular altitude 316. The second altitude angle 320 is the angle between the second ray 210 and the perpendicular altitude 316. The first altitude angle 318 and the second altitude angle 320 may increase or decrease by the movement of the boom 114 corresponding to the increase and/or decrease of the boom angle 314. A finder altitude 322, from the height of the range finder system 118 perpendicular to the ground may aid in the determination of the trench depth 304. The finder altitude 322 is also the sum of the track height 306 and boom altitude 308.

It will be recognized by one having ordinary skill in the arts that while the work machine 100 is operating the working mechanism 110, the position of the range finder system 118 on the boom 114 will move in position relative to the focal point 310. For example, as the boom 114 of an excavator operates the range finder system 118 may move towards or away in relation to the focal point 310 which increases or decreases the boom displacement 312. If the boom displacement 312 increases or decreases, then the boom altitude 308 may increase or decrease accordingly.

Figure 4:
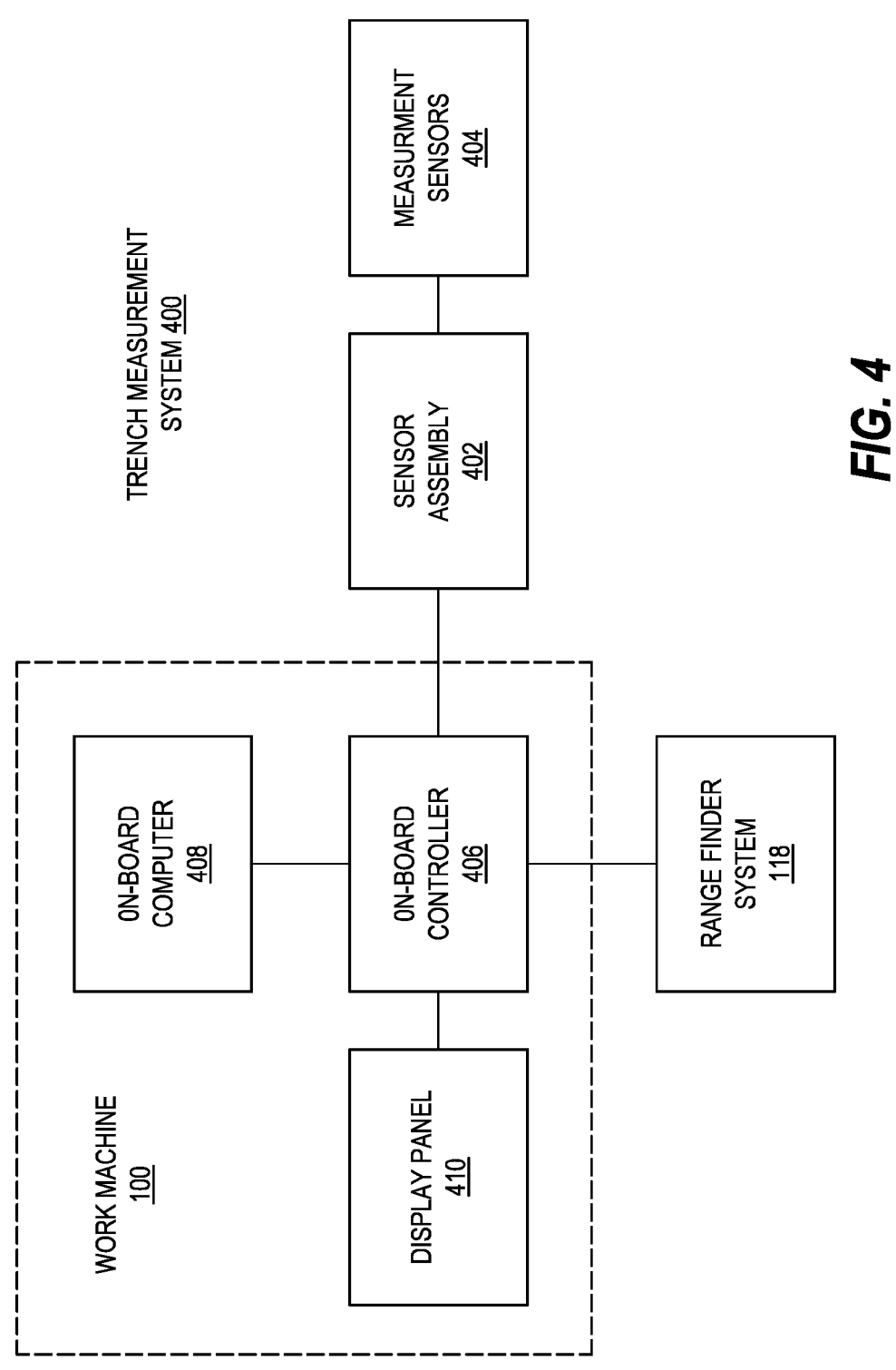
FIG. 4 shows a trench measuring system for measuring a trench depth by a work machine, according to an embodiment.

Referring to FIG. 4, in one embodiment, the work machine 100 may comprise of a trench measuring system 400 for determining the trench depth 304 to the trench floor 302. The trench measuring system 400 comprises the range finder system 118 and a sensor assembly 402 that includes a plurality of measurement sensors 404 that generally measure attributes of the work machine 100 at a landscape environment, or properties of the work machine 100 itself These attributes may include the position/orientation of the boom 114, relative articulation of the various joints of the working mechanism 110, the boom angle 314, the first altitude angle 318, the second altitude angle 320, and a machine pitch or grade level of the work machine 100 at a site. A variety of possible measurement sensors may be used, including angle sensors, displacement sensors, hydraulic pressure sensors, linear encoders, radial encoders, inertial measurement unit sensors, incline sensors, and string encoders. There are a number of different ways for the sensor assembly 402 generally and the individual sensors specifically to be constructed and/or mounted to the work machine 100, the frame 102, the boom 114, the arm 116, or other portions of the work machine 100. This will also depend in part on the construction of the work machine 100.

The work machine 100 may use the plurality of measurement sensors 404 for determining the boom displacement 312 from the focal point 310 to the position of the range finder system 118 in order to calculate the boom altitude 308, as well as the increased or decreased angles of the first altitude angle 318 and the second altitude angle 320 during operation of the boom 114. Generally, the plurality of measurement sensors 404 as well as the sensor assembly 402 itself range in complexity from simplistic measurement devices to more complicated devices which include their own onboard computer processors, memory, and the communications adapters. The plurality of measurement sensors 404 and/or sensor assembly 402 together may function to record, store, and report information to an on-board controller 406 and/or an on-board computer 408. Any given sensor may record or the sensor assembly 402 may append a time stamp to recorded data for when data was recorded. Data collected by the sensor assembly 402 and range finder system 118 is communicated to the on-board controller 406 and the on-board computer 408 to assist in measuring the trench depth 304 during a trench digging routine. During the trench digging routine, the trench depth 304 may be displayed on a display panel 410 in the work machine 100.

As the range finder system 118 collects the distance of the first ray 208 and the distance of the second ray 210, the range finder system 118 communicates with the on-board controller 406 and the on-board computer 408. The on-board computer 408 may calculate the trench depth 304 from the data received from the range finder system 118, the sensor assembly 402, and the measurement sensors 404. The calculated trench depth 304 may then be displayed on the display panel 410 in the work machine 100.

It may be recognized that in some instances during operation of the work machine 100, the working mechanism 110 may be positioned so that the boom 114 causes the range finder system 118 to be out of range preventing the ability to determine a viable or accurate calculation of the trench depth 304. This may occur when the first ray 208 and/or the second ray 210 are pointed in a direction that does not provide an accurate reading of the distance to the trench floor 302. The range finder system 118 may be turned off when the measurement sensors 404 recognize the boom 114 exceeds a certain threshold of the boom angle 314, the first altitude angle 318, and/or the second altitude angle 320 that results in the first rangefinder 200 and second rangefinder 202 being out of range. The first rangefinder 200 and second rangefinder 202 may be considered out of range when the first ray 208 and/or the second ray 210 are directed away from the trench floor 302. There may be an out-of-range signal reported on the display panel 410 to alert an operator.

When the range finder system 118 is out of range, an operator may use the on-board controller 406 to set the working mechanism 110 to a pre-set position that moves the working mechanism 110, the boom 114, and the arm 116 in a preferred position to obtain a reading by the range finder system 118. The on-board controller 406 may have an operation feature that directs the boom 114 to move the range finder system 118 into a preferred or pre-arranged position with the first ray 208 and the second ray 210 directed towards the trench floor 302.

When at the ground level site 300, the first ray 208 or second ray 210 may be perpendicular to the trench floor 302 so as to act as the perpendicular altitude 316. For example, if the second ray 210 acts as the perpendicular altitude 316, the trench depth 304 may equal the distance of the second ray 210 minus the track height 306 minus the boom altitude 308.

As used herein, Trench depth 304=(distance of perpendicular first ray 208 or perpendicular second ray 210)−(track height 306+boom altitude 308); and Boom altitude 308=sin (boom angle 314)×boom displacement 312.

To aid in continuous readings and spot-reading of the trench depth 304, the trench measuring system 400 can also determine the trench depth 304 when the second ray 210 is not perpendicular to the trench floor 302 with the aid of ray angle 206, the first altitude angle 318, and the second altitude angle 320, which all may be a fixed value known when mounting the range finder system 118 on the boom 114. When the ray angle 206, the first altitude angle 318, and the second altitude angle 320 is known, the perpendicular altitude 316 from the range finder system 118 to the trench floor 302 can be determined by the ray angle 206, the first altitude angle 318, the second altitude angle 320, and/or the lengths of the first ray 208 and the second ray 210 in order to measure the trench depth 304. For example, one may determine the perpendicular altitude 316 from the trench floor 302 to the range finder system 118 when the first ray 208 and the second ray 210 form an oblique triangle with the trench floor 302.

Figure 5:
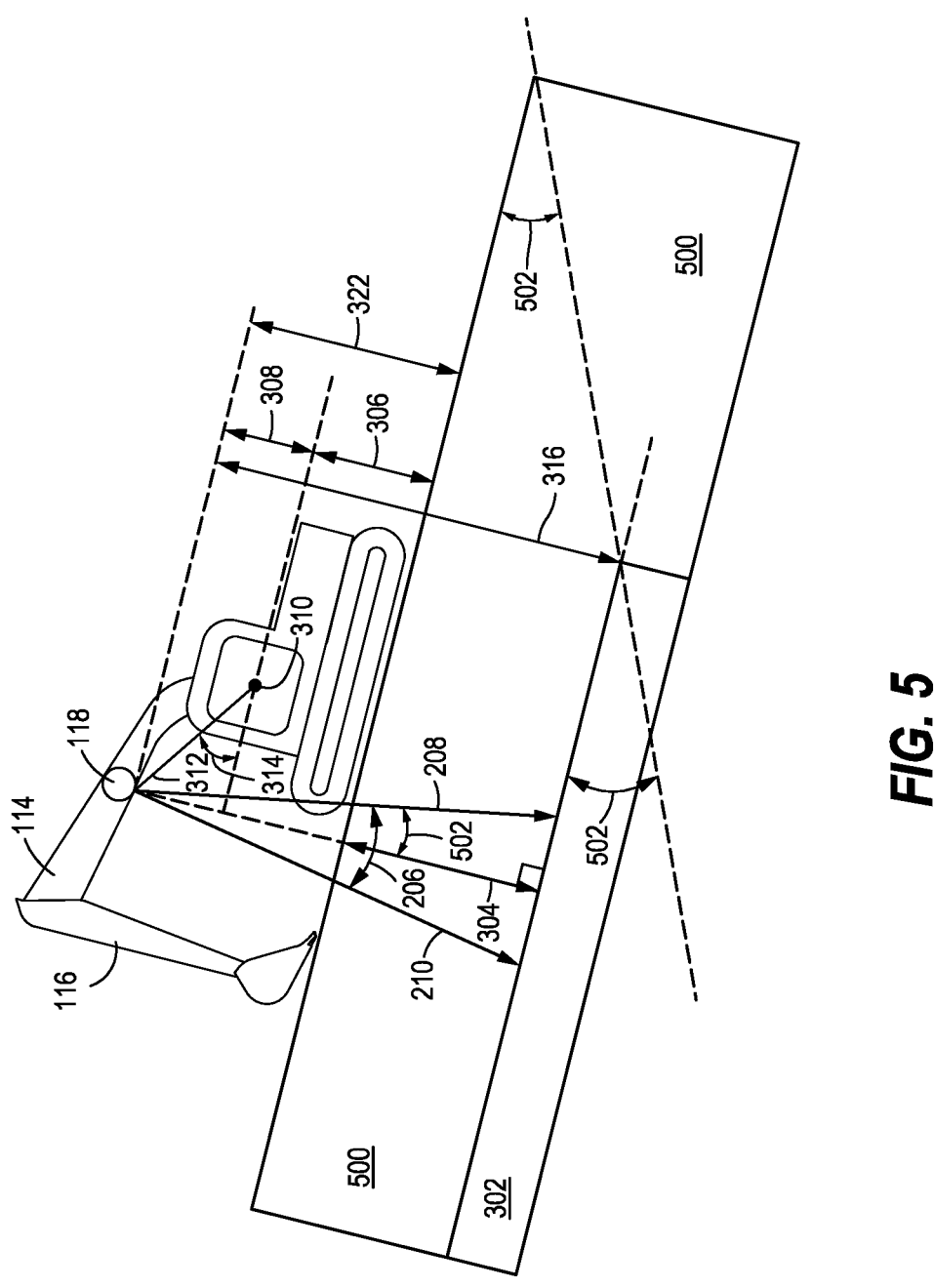
FIG. 5 is a schematic view of the work machine at a dig site measuring the trench depth with the range finder system on a slope, according to an embodiment.

Referring to FIG. 5, in another embodiment, the work machine 100 may operate at a sloped site 500. The measurement sensors 404 may determine the machine pitch 502 of the work machine 100 at the sloped site 500. The machine pitch 502 is the grade angle of the sloped site 500. While at a sloped site 500, the trench depth 304 is measured by determining the perpendicular altitude 316. The perpendicular altitude 316 is the perpendicular distance from the position of the range finder system 118 to the trench floor 302. The perpendicular altitude 316 at the sloped site 500 can be determined by the distance of the second ray 210 to the trench floor 302 and the machine pitch 502 angle. The trench depth 304 is then determined by measuring the difference of the perpendicular altitude 316 from the total of the track height 306 and the boom altitude 308. The boom altitude 308 is determined by the boom angle 314 and the boom displacement 312. The boom displacement 312 is measured by the distance between the focal point 310 and the position of the range finder system 118. The boom displacement 312 can be measured by using the plurality of measurement sensors 404 by determining the distance between the focal point 310 and the range finder system 118. A displacement sensor may be used to determine the boom displacement 312. The boom displacement 312 and the boom angle 314 are communicated by the plurality of measurement sensors 404 to the on-board controller 406 and on-board computer 408 to calculate the boom altitude 308, the first altitude angle 318, and the second altitude angle 320. The track height 306 is a known value set by the attributes of the work machine 100 and used by the on-board computer 408 to calculate the trench depth 304.

Figure 6:
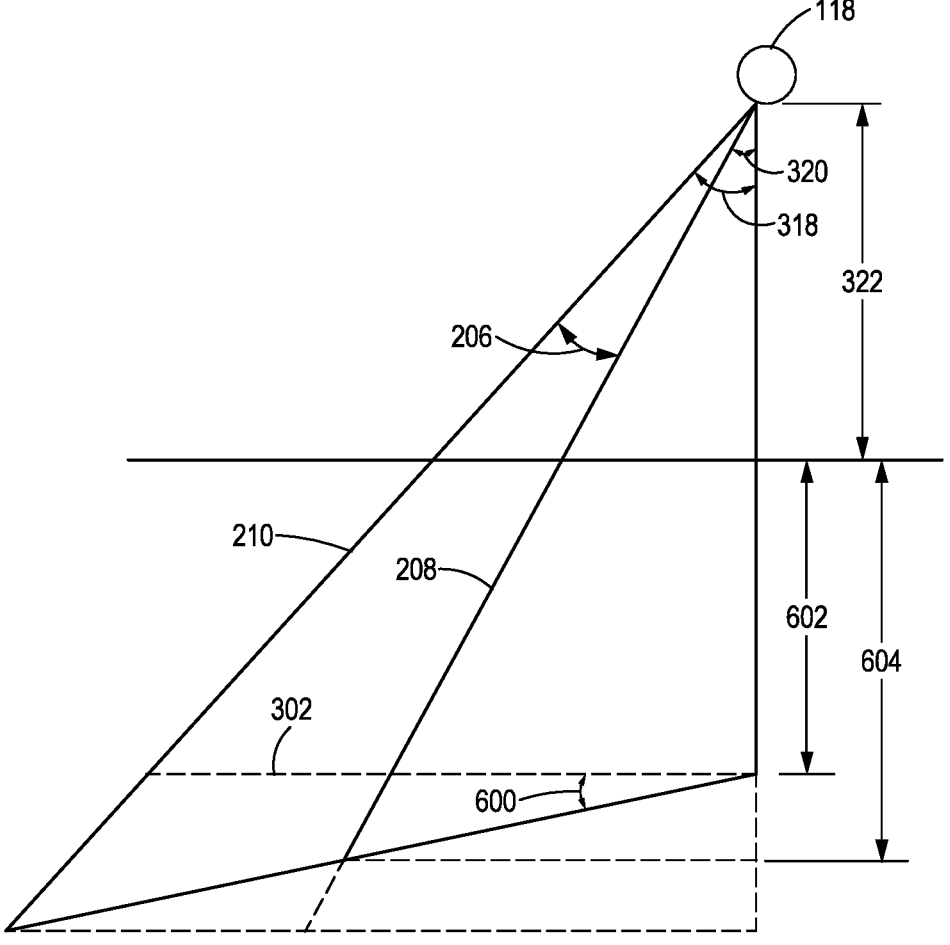
FIG. 6 shows a schematic view of the trench measuring system at a trench determining the trench depth and the trench floor angle with the range finder system.
Figure 7:
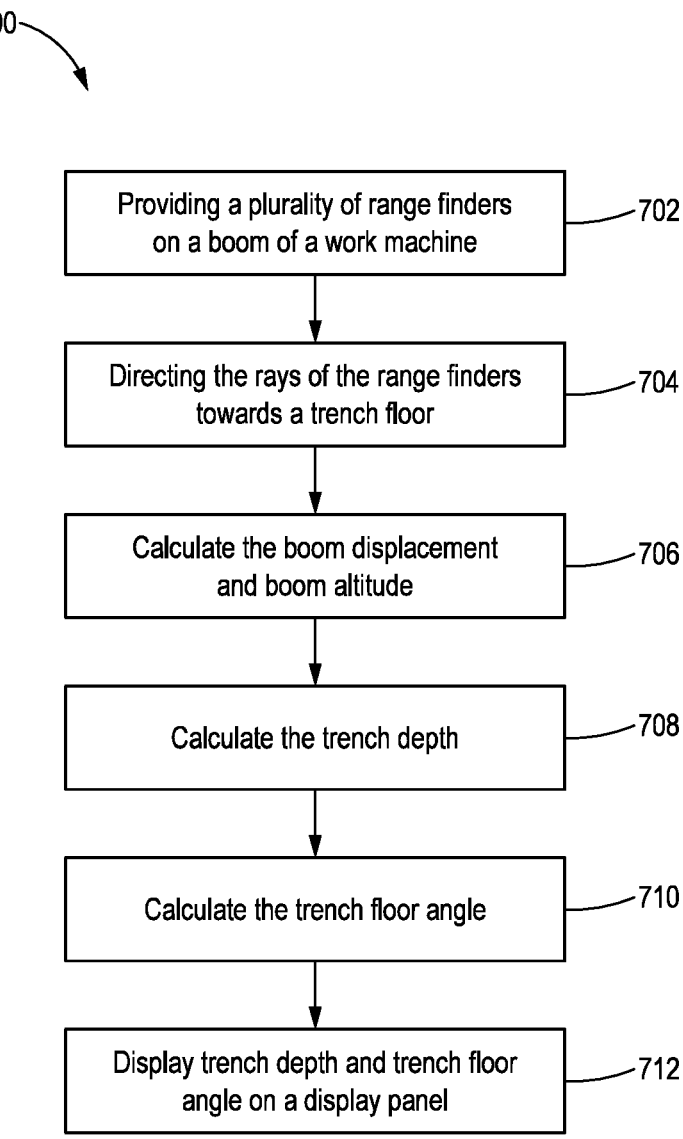
FIG. 7 is a flow chart of a method of measuring a trench depth by a work machine during a trench digging operation, according to an embodiment.

Now referring to FIG. 6, it can be understood that the trench measuring system 400 can also determine a trench floor angle 600 of the trench floor 302 during operation of the work machine 100. By obtaining the distance of the first ray 208 and second ray 210, the trench floor angle 600 of the trench floor 302 may also be determined. The trench floor angle 600 of the trench floor 302 may be calculated from the data stored and/or received by the on-board computer 408 from the range finder system 118 and the sensor assembly 402. The trench measuring system 400 may utilize the values of the first ray 208, second ray 210, ray angle 206, first altitude angle 318, second altitude angle 320, the track height 306, boom displacement 312, and the attributes of the work machine 100 to calculate the trench floor angle 600, during operation of the work machine 100. In FIG. 6, the first ray 208 and second ray 210 are directed at the trench floor 302 at different depths with the first ray 208 meeting the trench floor 302 at a first depth 602 and the second ray 210 meeting the trench floor 302 at a second depth 604. The trench floor angle 600 may be determined from the distances of the first ray 208 and the second ray 210 to the trench floor 304 at the first depth 602 and the second depth 604. The trench floor angle 600 may help aid the operator of the work machine 100 by providing the slope of a trench during a trench digging operation for design intent of the trench and for other reasons such as safety.

Based on the foregoing it can be seen that Trench depth 304=perpendicular altitude 316−(track height 306+boom altitude 308); Perpendicular altitude 316=(distance of second ray 210)/cos (machine pitch 502); and Boom altitude 308=sin (boom angle 314)×boom displacement 312.

If first ray 208<[(second ray 210)/cos (ray angle 206)]× 1.05 && (AND) first ray 208>[(second ray 210)/cos (ray angle 206)]×0.95, then trench depth 304=second ray 210− (track height 306+boom altitude 308). The 1.05 and 0.95 represent a theoretical tolerance used as a theoretical adjustment by mathematically adjusting the value of the first ray 208 distance to predict a theoretical second ray 210 value for determining if the trench floor is level. If the theoretical second ray 210 value is within this tolerance then a level trench is assumed and the depth can be calculated simply off the first ray 208 reading. For example, a +/−5% tolerance represents the 1.05 and 0.95 tolerances to adjust the value of the first ray 208 to determine the theoretical second ray 210. Essentially, the algorithm is taking the first ray 208 and calculates the theoretical value of the theoretical second ray 210 with the assumption of a flat trench floor. If the theoretically calculated value for second ray 210 is within the tolerance of the actual measured value then it is assumed the trench floor is level to be shown in the display.

The pseudocode, in one representative embodiment of the trench measuring system 400, follows: If a theoretical second ray 210=(second ray 210 +/−Tolerance), THEN: trench depth 304=first ray 208×cos(first altitude angle 318)−boom displacement 312×sin(boom angle 314)+track height 306; ESLEIF theoretical second ray 210>(second ray 210 +/−Tolerance) OR theoretical second ray 210<(second ray 210 +/−Tolerance), THEN in a non-parallel slope, the trench depth 304=[finder altitude 322×second ray 210×sin(second altitude angle 320)−first ray 208×cos(first altitude angle 318)×second ray 210×sin(second altitude angle 320)+second ray 210×cos(second altitude angle 320)×first ray 208× sin(first altitude angle 318)−finder altitude 322×first ray 208×sin(first altitude angle 318)]/[first ray 208×sin(first altitude angle 318)−second ray 210×sin(second altitude angle 320)] and the trench floor angle 600=Tan$^{-1}$([first ray 208× cos(first altitude angle 318)−finder altitude 322−trench depth 304]/[first ray 208×sin(first altitude angle 318)]).

INDUSTRIAL APPLICABILITY

In operation, the present disclosure may find applicability in many industries including, but not limited to, the construction, earth-moving, and agricultural industries. Specifically, the technology of the present disclosure may be used in work machines for digging trenches including but not limited to excavators, backhoes, and front-end loaders and the like having a boom, an arm, and a work implement such as buckets, dippers, dig tools, and the like. While the foregoing detailed description is made with specific reference to excavators, it is to be understood that its teachings may also be applied onto the booms of other work machines such as back-hoes, front-end loaders, and the like.

As the work machine 100 operates the working mechanism 110, the operator of the work machine 100 may obtain readings of the trench depth 304 without the need of a second operator standing aside the work machine 100 to measure the trench depth 304 with a trench rod or other conventional method. The operator can operate the work machine 100 until the trench depth 304 reaches a desired level to the trench floor 302, per trench design requirements of a trench digging operation. Measurements of the trench depth 304 may be calculated continuously or by spot-reading at pre-determined times by an operator. The calculated measurements of the trench depth 304 and trench floor angle 600 may be communicated to the on-board controller 406 and displayed on the display panel 410 to aid in a trench digging operation.

The present disclosure relates to a method 700 for measuring the trench depth 304 associated with a trench digging operation. First, in a step 702, a range finder system 118 is provided on a boom 114 of a work machine 100. The range finder system 118 may comprise of the first rangefinder 200 and the second rangefinder 202. It may be recognized that there may be a plurality of rangefinders in the range finder system 118. Next, in a step 704, the first ray 208 and the second ray 210 are directed towards the trench floor 302. It may be recognized that there may be a plurality of rays from a plurality of rangefinders in the range finder system 118 directed at the trench floor 302.

In a step 806, the method includes calculating the boom displacement 312 and boom altitude 308. The on-board computer 408 then calculates the trench depth 302, in a step 708, and calculates the first depth 602, the second depth 604, and the trench floor angle 600 in a step 710. The data of the trench floor is then displayed on a display panel in a step 812 for aiding the operator of the work machine during a trench digging operation.

Determining the trench depth without the need of a second worker removes unnecessary labor costs. Work machines that can measure the depth to a trench floor during operation saves time and labor costs from unnecessary delays required to confirm a trench design with a second operator. It is thus desirable to have a work machine that can measure a trench depth in a trench digging operations to remove the need for extra personnel and increase the safety of periodically checking trench depth to confirm design intent.

From the foregoing, it can be seen that the technology disclosed herein has industrial applicability in a variety of settings such as, but not limited to, measuring a depth of a trench during a trench digging operation by a work machine.

What is claimed is:

1. A work machine capable of measuring a trench depth during a trench digging operation, comprising:

a frame;

a ground engaging element supporting the frame for movement;

an engine mounted on the frame;

a working mechanism extending from the frame comprising a boom, an arm, and a work implement;

a sensor assembly, the sensor assembly comprising a plurality of sensors mounted on the work machine;

a display panel;

a range finder system mounted on the boom at a boom position, and including a plurality of rangefinders, each rangefinder including a beam device configured to determine a distance of a plurality of rays irradiated from the beam device to a trench floor; and an on-board controller configured to calculate the trench depth from data received by the range finder system, the sensor assembly, the boom position on the working mechanism, and attributes of the work machine;

wherein the on-board controller is configured to (i) detect whether at least one of the plurality of rangefinders is out of range; and upon detecting at least one of the plurality of rangefinders is out of range, (ii) signal to the display panel that the at least one of the plurality of rangefinders is out of range, and (iii) set the at least one of the plurality of rangefinders in a pre-set position such that the at least one of the plurality of rangefinders are in range.

2. The work machine according to claim 1, wherein the range finder system includes at least two rangefinders including a (i) first rangefinder comprising a first beam device configured to emit a first ray and a (ii) second rangefinder comprising a second beam device configured to emit a second ray;

wherein the first rangefinder is configured to detect a distance of the first ray from the first beam device to the trench floor;

wherein the second rangefinder is configured to detect a distance of the second ray from the second beam device to the trench floor; and further wherein the on-board controller is configured to calculate the trench depth from the distance of the first ray and the distance of the second ray, the sensor assembly, attributes of the work machine, and the boom position on the working mechanism.

3. The work machine according to claim 2, wherein the attributes of the work machine received by the on-board controller are a track height of the work machine, a boom altitude determined by a boom angle and a boom displacement from a focal point to the boom position on the working mechanism, a first altitude angle, and a second altitude angle.

4. The work machine according to claim 3, wherein the sensor assembly is configured to measure a machine pitch and the boom angle; and the plurality of sensors further includes at least one of inertial measurement units, positions angle sensors, machine pitch sensors, or a grade measurement unit sensor.

5. The work machine according to claim 2, wherein the first rangefinder and the second rangefinder are mounted on the boom at a fixed position forming a fixed angle between the first rangefinder and the second rangefinder, a first altitude angle, and a second altitude angle.

6. The work machine according to claim 1, wherein the display panel displays the trench depth.

7. The work machine according to claim 1, wherein the range finder system includes a plurality of laser devices, and wherein the plurality of laser devices includes at least one laser beam.

8. The work machine according to claim 1, wherein the sensor assembly includes a machine pitch sensor configured to measure a machine pitch of the work machine at a sloped site, and wherein the trench depth at the sloped site is determined by calculating a difference between a perpendicular distance from the position of the range finder system to the trench floor and a total of a track height of the work machine and a boom altitude, the boom altitude determined by a boom angle and a boom displacement from a focal point to the boom position on the working mechanism.

9. A trench measuring system for measuring a trench depth, the trench measuring system comprising:

a work machine, the work machine including a boom;

an on-board controller on the work machine;

a display panel;

a sensor assembly, the sensor assembly including a plurality of sensors mounted on the work machine;

a range finder system, the range finder system being mounted on a boom at a boom position, the range finder system further including a plurality of rangefinders, each rangefinder including a beam device configured to determine a distance of a plurality of rays from the beam device to a trench floor; and the on-board controller configured to calculate the trench depth from data received by the plurality of rays, attributes of the work machine, the sensor assembly, and the boom position on a working mechanism;

wherein the on-board controller is configured to (i) detect whether at least one of the plurality of rangefinders is out of range; and upon detecting at least one of the plurality of rangefinders is out of range, (ii) signal to the display panel that the at least one of the plurality of rangefinders is out of range, and (iii) set the at least one of the plurality of rangefinders in a pre-set position such that the at least one of the plurality of rangefinders are in range.

10. The trench measuring system according to claim 9, wherein the range finder system includes at least two rangefinders including a (i) first rangefinder comprising a first beam device configured to emit a first ray and a (ii) second rangefinder comprising a second beam device configured to emit a second ray, the first rangefinder and the second rangefinder are mounted on the boom at a fixed position forming a fixed angle between the first rangefinder and the second rangefinder, wherein:

the first rangefinder is configured to detect a distance of the first ray from the first beam device to the trench floor;

the second rangefinder is configured to detect a distance of the second ray from the second beam device to the trench floor; and wherein the on-board controller is configured to calculate the trench depth from the sensor assembly, the range finder system, attributes of the work machine, and the boom position on the working mechanism.

11. The trench measuring system according to claim 9, wherein the attributes of the work machine received by the on-board controller are a track height of the work machine and a boom altitude determined by a boom angle and a boom displacement from a focal point to the boom position on the working mechanism.

12. The trench measuring system according to claim 9, wherein the sensor assembly is configured to measure a machine pitch and a boom angle during operation of the work machine at a trench digging operation; and the plurality of sensors further includes at least one of inertial measurement units, positions angle sensors, machine pitch sensors, or a grade measurement unit sensor.

13. The trench measuring system according to claim 9, wherein the display panel displays the trench depth.

14. The trench measuring system according to claim 9, wherein the on-board controller provides a feature configured to direct the boom into a position so that the plurality of rays is directed towards the trench floor.

15. The trench measuring system according to claim 9, wherein the range finder system comprises a plurality of laser devices, and wherein the plurality of laser devices includes at least one laser beam.

16. A method for measuring a trench depth, comprising:

providing a work machine having a frame, a ground engaging element supporting the frame for movement, an engine mounted on the frame, a display panel, a working mechanism extending from the frame comprising a boom, an arm, and a work implement;

providing a plurality of rangefinders mounted on the boom of the work machine;

directing rays from the plurality of rangefinders towards a trench floor; and calculating the trench depth based on the rays and a position of the boom with an on-board controller, wherein the on-board controller is configured to (i) detect whether at least one of the plurality of rangefinders is out of range; and upon detecting at least one of the plurality of rangefinders is out of range, (ii) signal to the display panel that the at least one of the plurality of rangefinders is out of range, and (iii) set the at least one of the plurality of rangefinders in a pre-set position such that the at least one of the plurality of rangefinders are in range.

17. The method according to claim 16, wherein the method further comprises:

calculating a trench floor angle based on the rays and the position of the boom with the on-board controller.

18. The method according to claim 16, wherein the method further comprises:

displaying the calculated trench depth and a trench floor angle via the display panel.

19. The method according to claim 18, wherein the on-board controller provides a feature configured to direct the boom into a position so that the rays are directed towards the trench floor.

20. The method according to claim 16, wherein the plurality of rangefinders comprises a plurality of laser devices, the plurality of laser devices includes at least one laser beam.

* * * * *